United States Patent
Ling et al.

(10) Patent No.: US 9,952,709 B2
(45) Date of Patent: Apr. 24, 2018

(54) USING HYBRID SIGNAL FOR LARGE INPUT OBJECT REJECTION

(71) Applicant: Synaptics Incorporated, San Jose, CA (US)

(72) Inventors: Yi Ling, Redwood City, CA (US); Sanjay Mani, Los Altos Hills, CA (US); Nickolas Fotopoulos, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 164 days.

(21) Appl. No.: 14/966,979

(22) Filed: Dec. 11, 2015

(65) Prior Publication Data

US 2017/0168632 A1    Jun. 15, 2017

(51) Int. Cl.
  *G06F 3/041*    (2006.01)
  *G06F 3/044*    (2006.01)

(52) U.S. Cl.
  CPC ............ *G06F 3/0416* (2013.01); *G06F 3/044* (2013.01); *G06F 2203/04101* (2013.01); *G06F 2203/04104* (2013.01)

(58) Field of Classification Search
  CPC .................. G06F 3/044; G06F 3/0416; G06F 2203/04104; G06F 2203/04101; G06F 2203/04108
  See application file for complete search history.

(56) References Cited

U.S. PATENT DOCUMENTS

| | | | |
|---|---|---|---|
| 8,446,374 B2 | 5/2013 | Westerman | |
| 8,633,718 B2 | 1/2014 | Yeh et al. | |
| 9,080,919 B2 | 7/2015 | Yeh et al. | |
| 9,081,450 B1 | 7/2015 | Mohindra | |
| 2010/0026655 A1* | 2/2010 | Harley | G06F 3/044 345/174 |
| 2010/0053095 A1 | 3/2010 | Wu et al. | |
| 2011/0012855 A1 | 1/2011 | Yeh et al. | |
| 2011/0057670 A1* | 3/2011 | Jordan | G06F 3/0416 324/679 |
| 2011/0242005 A1 | 10/2011 | Ung et al. | |
| 2012/0105361 A1 | 5/2012 | Kremin et al. | |
| 2012/0262407 A1 | 10/2012 | Hinckley et al. | |
| 2013/0194225 A1* | 8/2013 | Shen | G06F 3/0416 345/174 |
| 2013/0222294 A1 | 8/2013 | Choi et al. | |
| 2014/0184554 A1 | 7/2014 | Walley | |
| 2014/0306912 A1 | 10/2014 | Woolley | |

* cited by examiner

*Primary Examiner* — Larry Sternbane
(74) *Attorney, Agent, or Firm* — FBFK PC

(57) ABSTRACT

A processing system for hybrid rejection includes a sensor module coupled to sensor electrodes, and configured to acquire sensing data using the sensor electrodes. The system further includes a determination module configured to obtain a capacitive image of a sensing region based on the sensing data, determine a input object set in the sensing region using the capacitive image, obtain a profile of the sensing region based on the sensing data, and determine a contiguous region width of a contiguous region in the profile. The contiguous region corresponds to a input object in the input object set. The determination module is further configured to filter the input object from the input object set based on the contiguous region width satisfying a size threshold to obtain a filtered input object set, and process the filtered input object set.

18 Claims, 10 Drawing Sheets

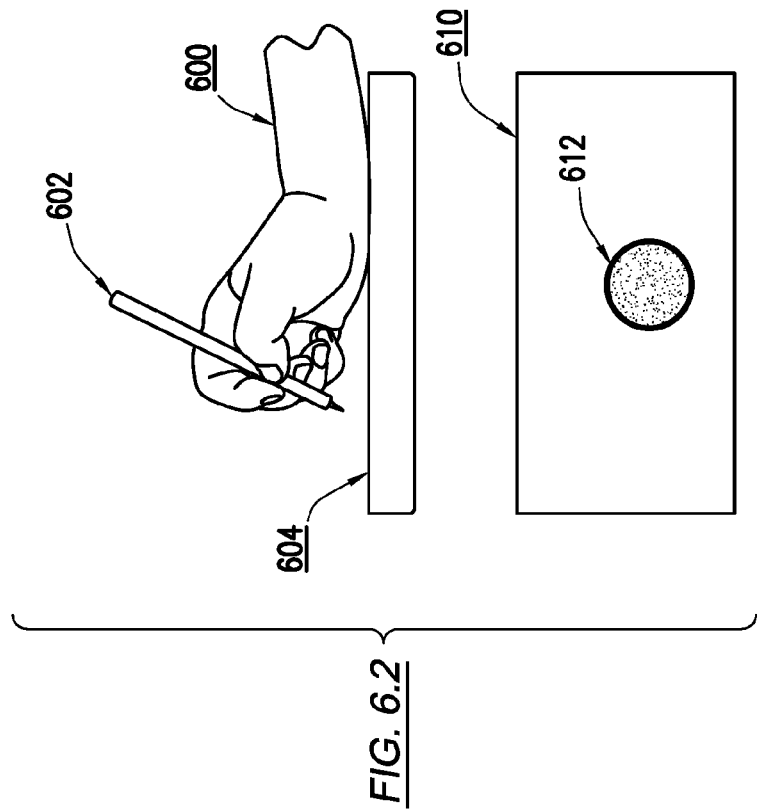
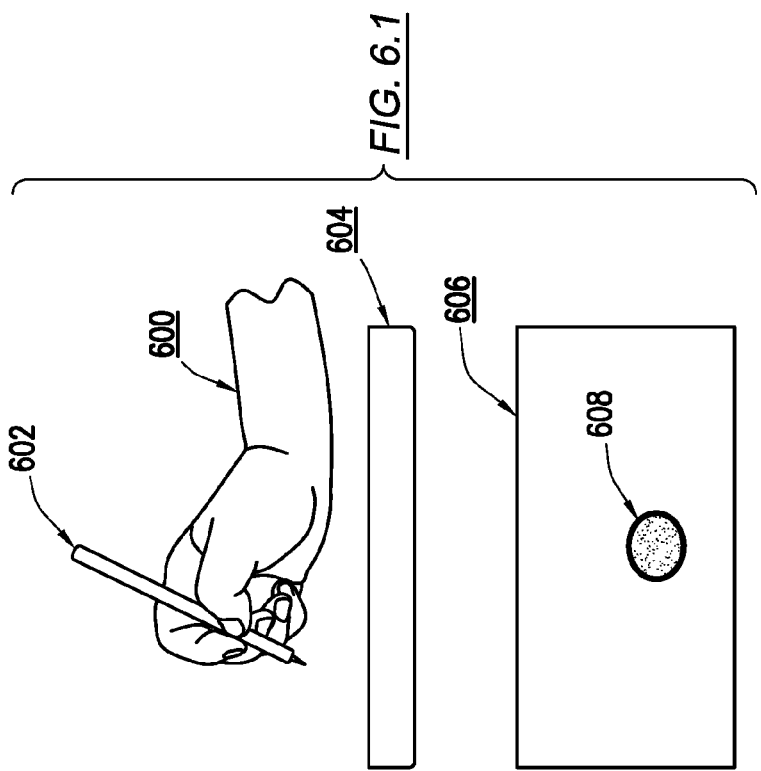
FIG. 6.1
FIG. 6.2

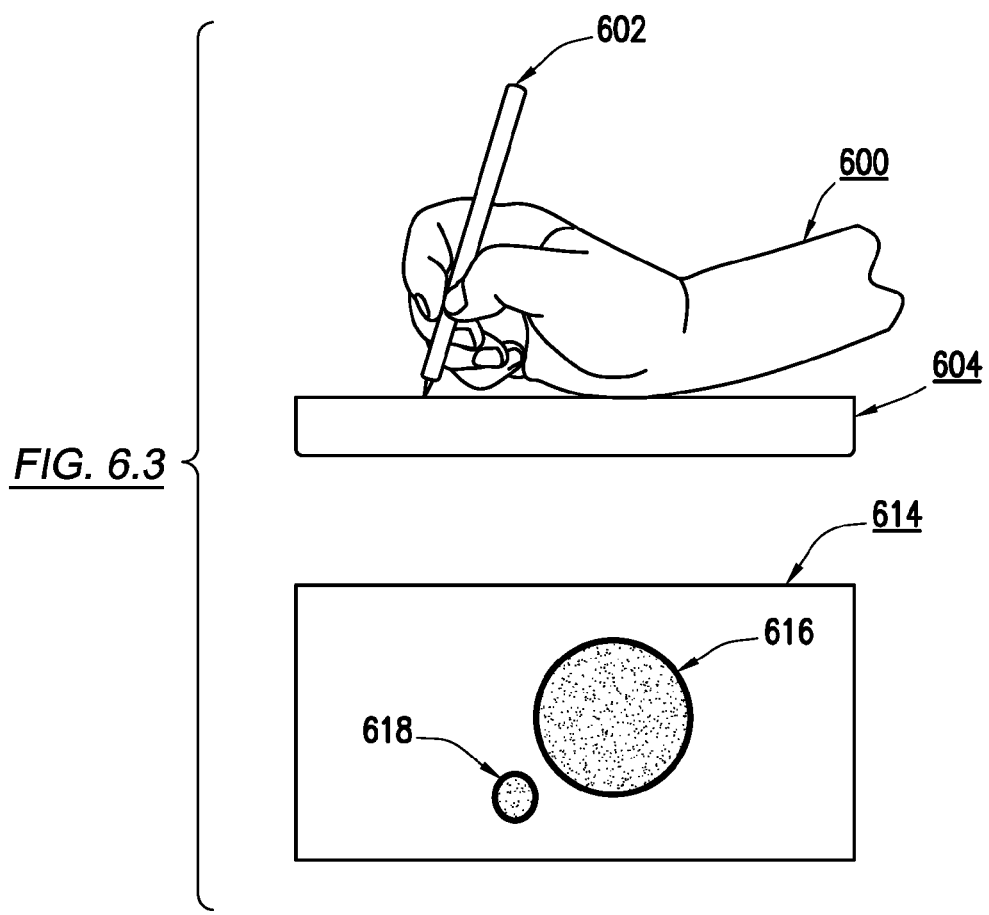
FIG. 6.3

USING HYBRID SIGNAL FOR LARGE INPUT OBJECT REJECTION

FIELD

This invention generally relates to electronic devices.

BACKGROUND

Input devices, including proximity sensor devices (also commonly called touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, one or more embodiments relate to a processing system for hybrid rejection. The system includes a sensor module coupled to sensor electrodes, and configured to acquire sensing data using the sensor electrodes. The system further includes a determination module configured to obtain a capacitive image of a sensing region based on the sensing data, determine a input object set in the sensing region using the capacitive image, obtain a profile of the sensing region based on the sensing data, and determine a contiguous region width of a contiguous region in the profile. The contiguous region corresponds to a input object in the input object set. The determination module is further configured to filter the input object from the input object set based on the contiguous region width satisfying a size threshold to obtain a filtered input object set, and process the filtered input object set.

In general, in one aspect, one or more embodiments relate to a method for hybrid rejection. The method includes acquiring sensing data, obtaining a capacitive image of a sensing region based on the sensing data, determining a input object set in the sensing region using the capacitive image, obtaining a profile of the sensing region based on the sensing data, and determining a contiguous region width of a contiguous region in the profile. The contiguous region corresponds to a input object in the input object set. The method further includes filtering the input object from the input object set based on the contiguous region width satisfying a size threshold to obtain a filtered input object set, and processing the filtered input object set.

In general, in one aspect, one or more embodiments relate to an input device for hybrid rejection. The input device includes sensor electrodes configured to acquire sensing data, and a processing system. The processing system is configured to obtain a capacitive image of a sensing region based on the sensing data, determine a input object set in the sensing region using the capacitive image, obtain a profile of the sensing region based on the sensing data, determine a contiguous region width of a contiguous region in the profile. The contiguous region corresponds to a input object in the input object set. The processing system is further configured to filter the input object from the input object set based on the contiguous region width satisfying a size threshold to obtain a filtered input object set, and process the filtered input object set.

Other aspects of the invention will be apparent from the following description and the appended claims.

BRIEF DESCRIPTION OF DRAWINGS

The preferred exemplary embodiment of the present invention will hereinafter be described in conjunction with the appended drawings, where like designations denote like elements.

FIGS. 6.1, 6.2, 6.3, 7, 8, and 9 are examples in accordance with one or more embodiments of the invention.

DETAILED DESCRIPTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present invention provide input devices and methods that facilitate improved usability. One or more embodiments are directed to performing a size based input object filtering using profiles. In particular, one or more embodiments filter input objects in a capacitive image based on the size of the input object input object in the profile.

Figure 1:
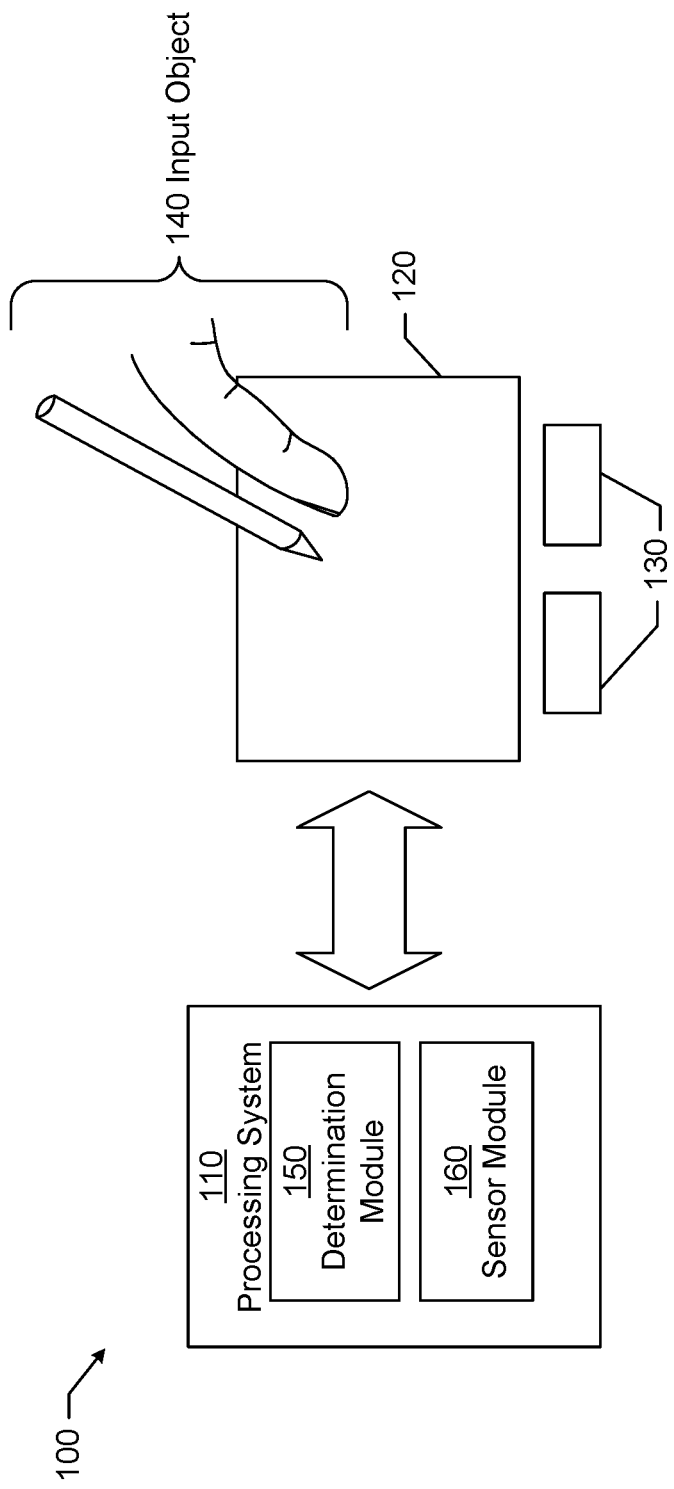
FIGS. 1 and 2 are block diagrams of an example system that includes an input device in accordance with one or more embodiments of the invention.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) may be part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects may exist in the sensing region (120). Further, which particular input objects are in the sensing region may change over the course of one or more gestures. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher-dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Some capacitive implementations use an electrode matrix. The electrode matrix may be integrated into a display panel of an input device. In one embodiment, source drivers may be mounted on the display panel and drive the display signals and capacitive sensing signals into the display panel. In one embodiment, the capacitive sensing signals may be routed on wires or traces that are interleaved on the same layer as the source lines used for setting a voltage on the pixels in the display panel during display updating. Using the interleaved traces, in one embodiment, the source drivers may drive the capacitive sensing signals in parallel to a plurality of the electrodes in the matrix in a predefined pattern that spans one or more sensing cycles. In one embodiment, the pattern may be designed to provide mathematically independent results such that an input device can derive individual capacitive measurements for each electrode in the matrix. Based on the resulting capacitive measurements derived during the sensing cycles, the input device may identify a location of an input object relative to the display panel. Furthermore, when driving the capacitive sensing signals on a first electrode, the input device may drive a guarding signal (or a constant voltage) on a second electrode proximate to the first electrode.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element (s) of the input device (100). In other embodiments, components of processing system (110) are physically separate with one or more components close to the sensing element (s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

It should be understood that while many embodiments of the invention are described in the context of a fully-functioning apparatus, the mechanisms of the present invention are capable of being distributed as a program product (e.g., software) in a variety of forms. For example, the mechanisms of the present invention may be implemented and distributed as a software program on information-bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer-readable storage medium. Examples of non-transitory, electronically-readable media include various discs, physical memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

Figure 2:
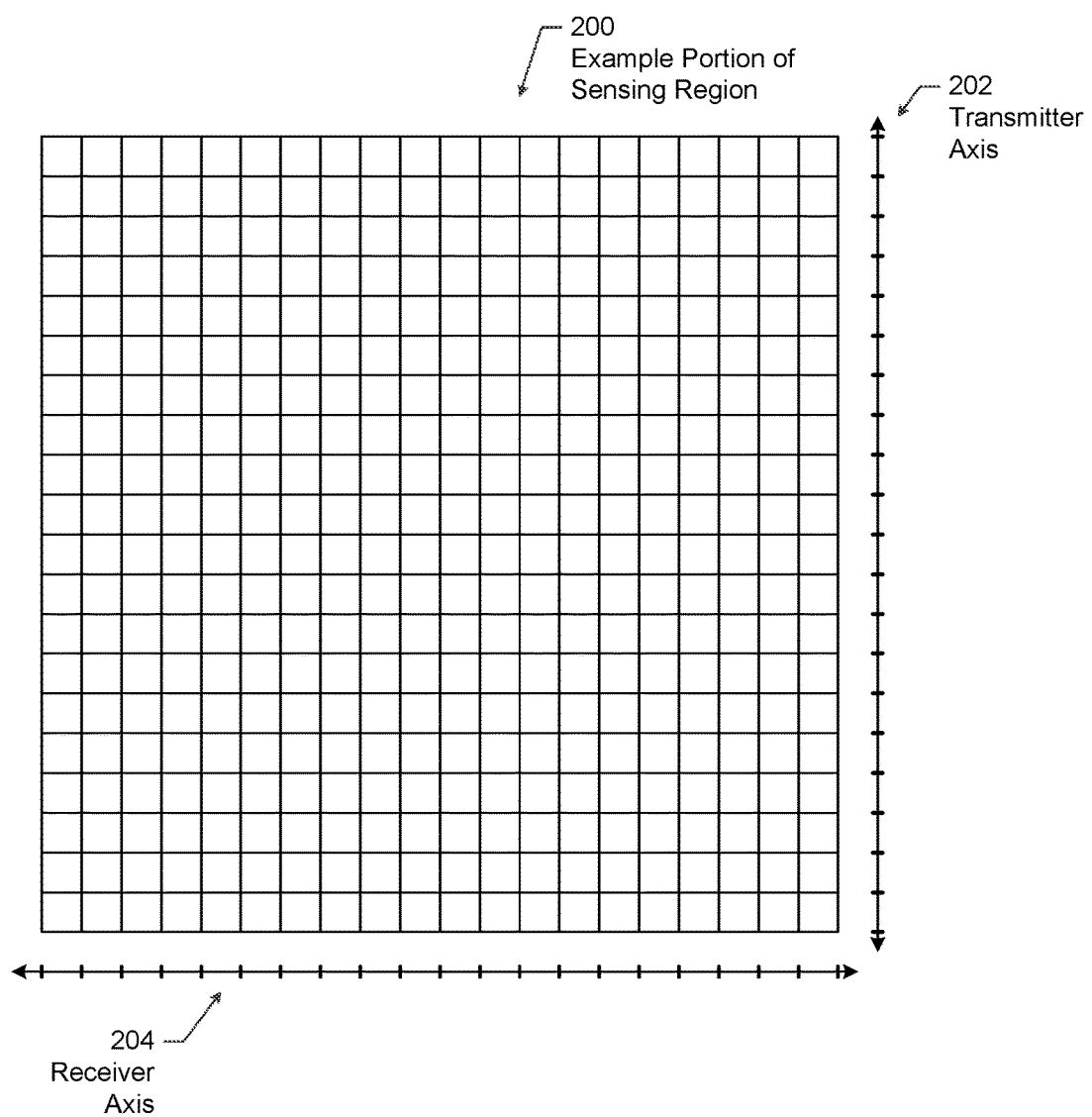

FIG. 2 shows an example diagram of portion of a sensing region (200) in accordance with one or more embodiments of the invention. In particular, FIG. 2 shows an example diagram of the sensing region for transcapacitive and absolute capacitive sensing using a grid pattern of electrodes. The example shown in FIG. 2 is for example purposes only. One or more embodiments may deviate from the example shown in FIG. 2. For example, the sensing technology described in United States Patent Publication Number 2015/0042599 may be used in at least some embodiments of the invention to obtain a capacitive image and capacitive profiles. United States Patent Publication Number 2015/0042599 is incorporated herein by reference in its entirety.

In one or more embodiments of the invention, the sensing region has a transmitter axis (202) and a receiver axis (204). The transmitter axis (202) has a set of transmitter electrodes that include functionality to transmit sensing signals. The receiver axis (204) includes a set of receiver electrodes that include functionality to receive sensing signals. The transmitter electrodes and receiver electrodes are sensor electrodes. For transcapacitive sensing, when a transmitter electrode, or sensor electrode on the transmitter axis, transmits a sensing signal, the resulting signals are received by the receiver electrodes, or second set sensor electrodes, on the receiver axis. Measurements obtained from the resulting signals may be referred to as capacitive sensor data. The measurements that are used may be raw measurements or pre-processed measurements. In one or more embodiments, the capacitive sensor data obtained by performing the transcapacitive sensing using each transmitter electrode may form a two dimensional capacitive image. In the two dimensional capacitive image, each intersection between the transmitter electrode and the receiver electrode has a corresponding value. In other words, the use of the term transcapacitive image refers to a set of measurements whereby each intersection has a measurement value. The image may or may not be in diagram form, whereby the measurement values are color or grayscale encoded or otherwise displayable.

Continuing with FIG. 2, one or more embodiments may include functionality to perform hybrid sensing. In other words, the input device shown in FIG. 1 may include functionality to obtain one or more profiles from the sensing region. A profile is a single dimensional set of values from the sensing region along a particular axis of the sensing region. For example, a receiver axis profile is a profile obtained along the receiver axis (204) of the sensing region (200). Notably, the receiver axis profile does not reference the function of the sensor electrodes during the acquisition of the profile as being receivers, but rather the function of the sensor electrodes in the corresponding mutual capacitance or active pen sensing. Namely, the receiver axis profile refers to a profile acquired along the sensor electrodes, which, during transcapacitive sensing, the sensor electrodes are on the receiver axis. Conversely, the transmitter axis profile refers to the profile acquired along the sensor electrodes, which, during the transcapacitive sensing, the sensor electrodes are on the transmitter axis. Thus, rather than being a two dimensional capacitive image of the sensing region, the collection of values in the receiver axis profile or the transmitter axis profile are single dimensional and include a single raw measured value for each hatch mark shown in FIG. 2 on the transmitter axis (202) and receiver axis (204).

In one or more embodiments, the profile includes effects of any input objects in the sensing region as well as input objects in the above surface sensing region (e.g., hovering input objects). In one or more embodiments of the invention, the measurements in the capacitive image includes effects of any input objects on the surface sensing region and some effects of input objects above the surface of the sensing region. However, the distance from the surface sensing region to which the input object is detectable in the capacitive image is less than the distance from the surface sensing region to which the input object is detectable in the profile.

As discussed above, FIG. 2 is only an example. The size, shape, number and configuration of electrodes may vary from the example shown in FIG. 2 without departing from the scope of the invention. In particular, although FIG. 2 shows the electrodes as being configured in a grid pattern, the electrodes may be arranged in a different pattern. Further, the use of the terms "first" and "second" in the claims with respect to sensor electrodes may refer to the receiver axis and/or the transmitter axis unless specifically claimed.

Figure 3:
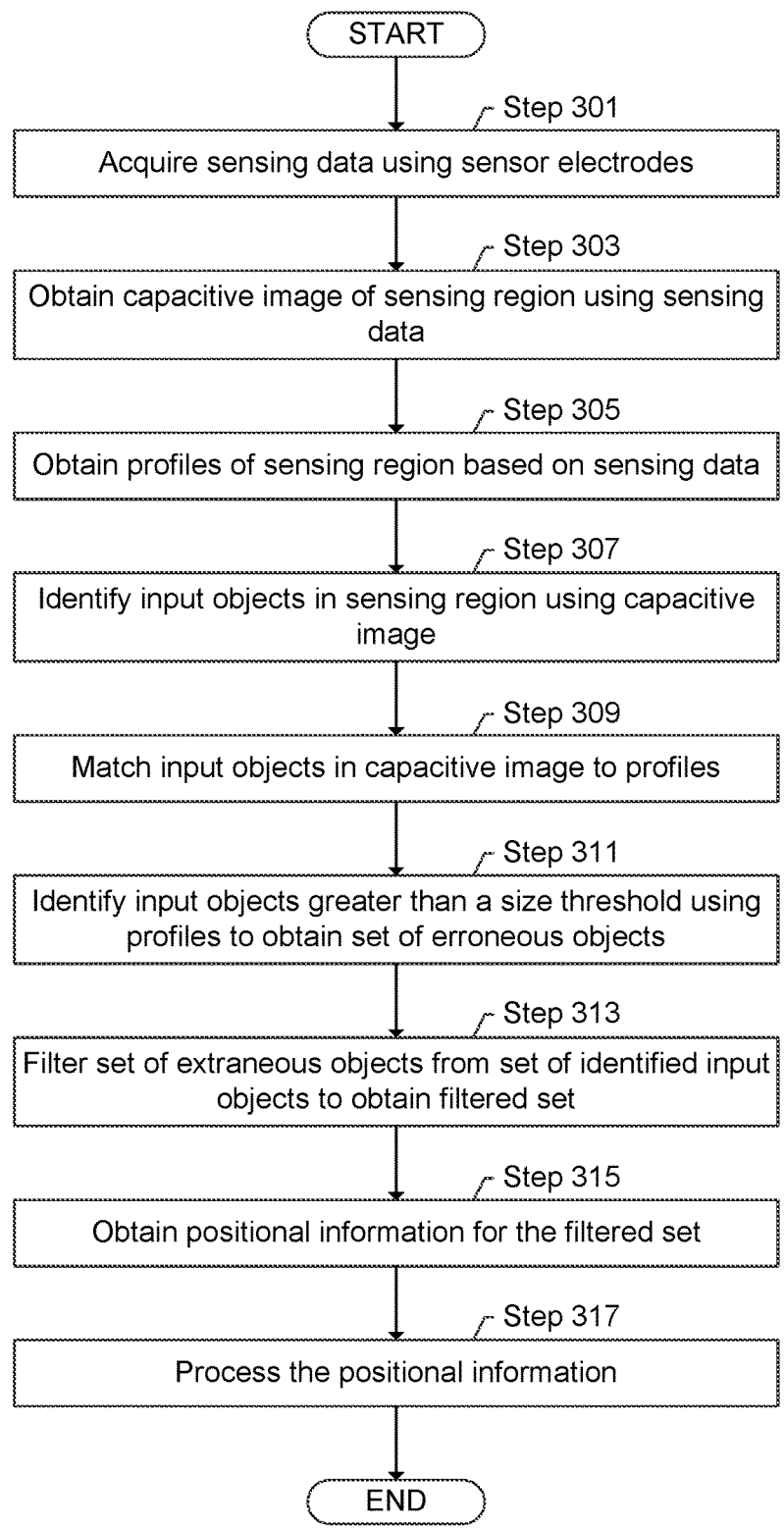
FIGS. 3, 4, and 5 are flowcharts in accordance with one or more embodiments of the invention.
Figure 4:
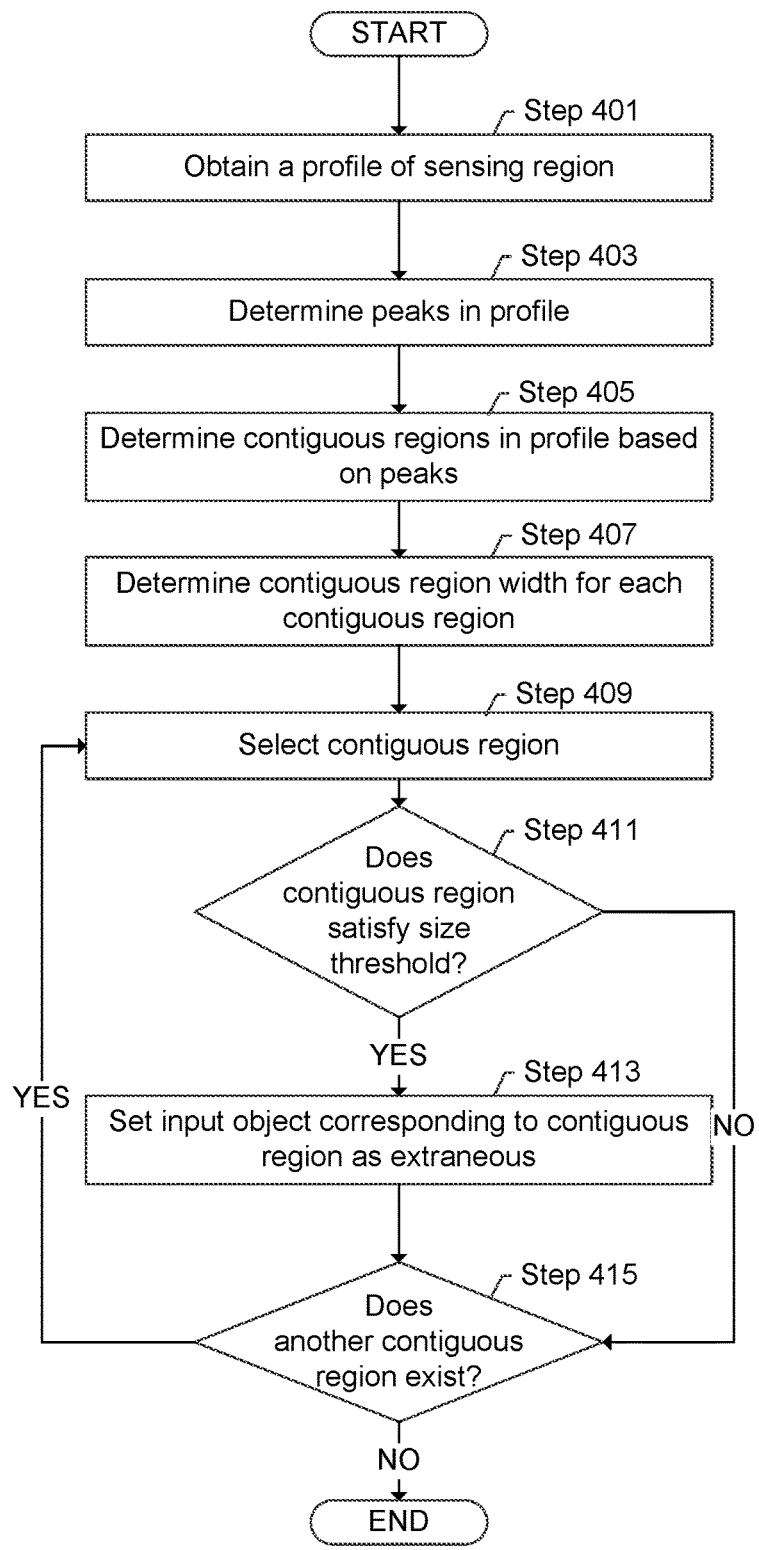
Figure 5:
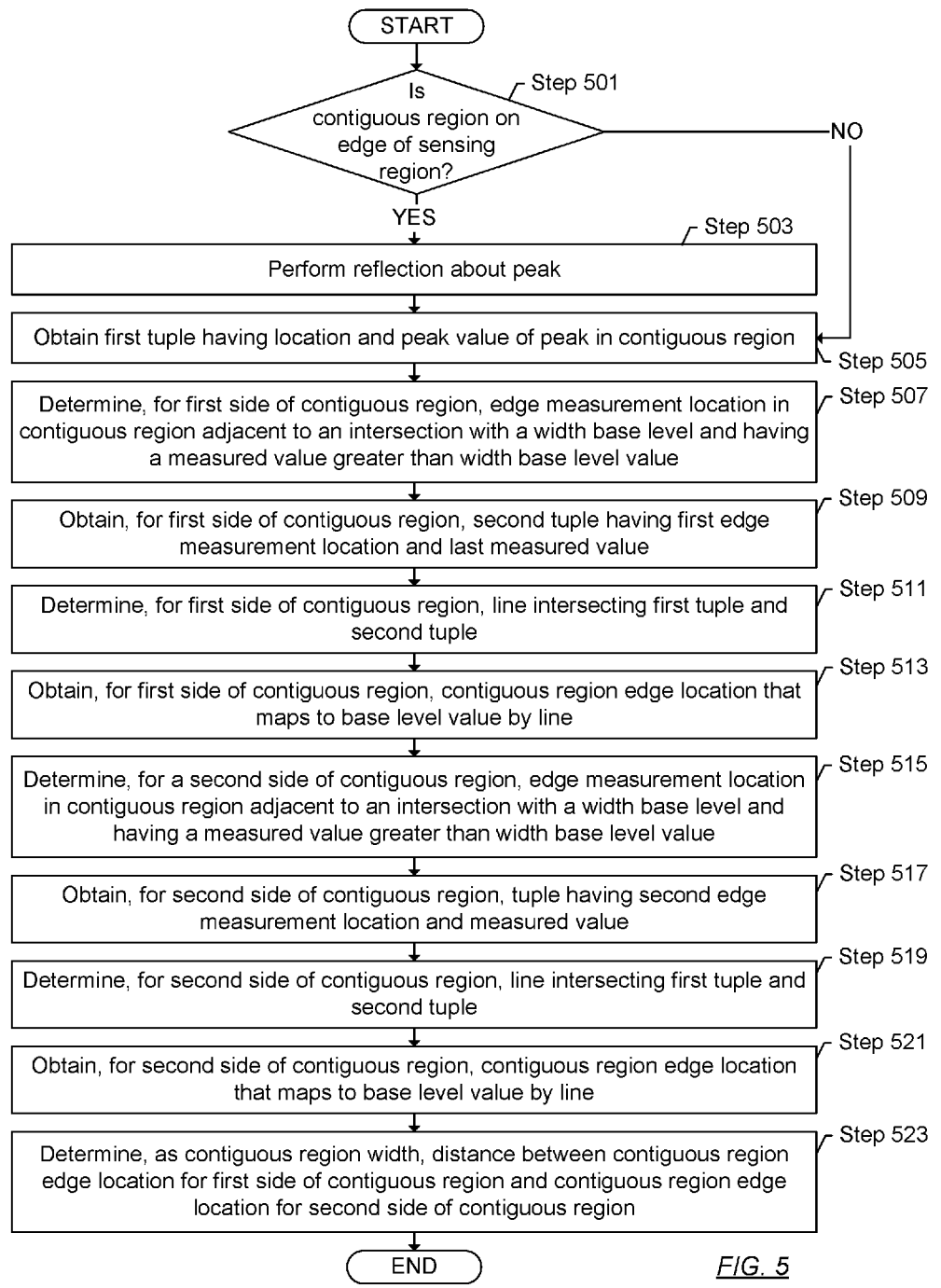

FIGS. 3-5 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 3 shows a flowchart for filtering input objects in the capacitive image based on a size of the input objects in the profile. In Step 301, sensing data is acquired using sensor electrodes in accordance with one or more embodiments of the invention. Acquiring sensing data may be performed using various sensing techniques described above. In one or more embodiments of the invention, the sensing techniques involve at least one proximity sensing technique (e.g., absolute capacitance) and at least one touch sensing technique (e.g., transcapacitive sensing).

In Step 303, a capacitive image of the sensing region is obtained using the sensing data in accordance with one or more embodiments of the invention. In particular, sensing data for the capacitive image are grouped into the capacitive image. Preprocessing may be performed on the sensing data, such as subtracting a baseline from the sensing data, performing temporal and/or spatial filtering on the sensing data, or performing any other preprocessing.

Similarly, in Step 305, one or more profiles of the sensing region are obtained using the sensing data in accordance with one or more embodiments of the invention. In particular, sensing data for the profiles are grouped into each profile. Similar to the capacitive image, preprocessing may be performed on the sensing data, such as subtracting a baseline from the sensing data, performing temporal and/or spatial filtering on the sensing data, or performing any other preprocessing.

In Step 307, input objects in the sensing region are identified using the capacitive image in accordance with one or more embodiments of the invention. Identifying input objects may be performed by identifying one or more peak values in the capacitive image that are greater than a detection threshold. In one or more embodiments of the invention, the detection threshold is a minimum measurement value by which an input object is determined to exist in the sensing region. Measurement values below the detection threshold may be determined to correspond to noise. Other types of detection thresholds may be used without departing from the scope of the invention. Using the peak values and the detection threshold, two dimensional contiguous regions in the capacitive image may be determined. Various techniques may be used to identify the two dimensional contiguous regions. Each two dimensional contiguous region may be determined to correspond to an input object. From the two dimensional contiguous regions, the position and size of each input object may be determined.

Continuing with FIG. 3, in Step 309, input objects in the capacitive image are matched to the profiles in accordance with one or more embodiments of the invention. In one or more embodiments, any input object detected in one or more profiles are determined. Detecting the input objects in the profiles may be performed similar to detecting input objects in the capacitive image. For example, peak values in the profiles greater than a detection threshold may be determined. The detection threshold may be different for the profiles than the detection threshold for the capacitive image. Further, the detection threshold may be different for different profiles. In one or more embodiments of the invention, using the peak values and the detection threshold segmentation may be performed to identify contiguous regions.

Two or more contiguous regions may be combined to create a single contiguous region. For example, two contiguous regions may be combined when the peak value of one contiguous region is within a threshold difference and threshold distance from the peak value of another contiguous region. Such scenario may exist, for example, when a user's palm has multiple points near the input surface. The result of the combination is a single contiguous region that spans both contiguous regions. In some embodiments, rules may be applied to define when contiguous regions are not to be combined. For example, if two neighboring contiguous regions have peak values within a threshold distance from each other, but not within a threshold difference in value, then the contiguous regions may be determined to relate to individual and distinct input objects. Such a scenario may exist, for example, when a user is holding a stylus. The peak value corresponding to the stylus may be geographically within a threshold distance to the peak value corresponding the hand, but have a much lower value than the peak value of the hand. Thus, the peak value corresponding to the stylus is correctly detected as being for a different input object than the peak value corresponding to the hand.

Matching the input objects in the capacitive image to the profiles may further be performed based on positional information. For example, one way to match input objects is to project the contiguous regions in the profiles onto each axis, while maintaining the locations of the detected input objects during the projections. Where the projections of contiguous regions on different axes intersect, locations of input objects in the profiles are determined. The matching may match the contiguous regions in the profiles with each other, such as by using the projection. If the capacitive image is not used, then any intersections between the projections of the profiles are determined to correspond to a possible input object and are matched. If the capacitive image is used in the matching, then the matching may remove some of the intersections between the projections as possible locations of an input object. In other words, the locations of the intersections are compared with the capacitive image to match the intersections and, thus, the corresponding regions in the profiles with the capacitive image.

In one or more embodiments of the invention, the process of the matching may relate a unique identifier of an input object location to the contiguous region. In the profiles, the same contiguous region may have multiple unique identifiers associated with the contiguous region. In particular, because the same contiguous region in the profile may correspond to multiple input objects, the same contiguous region may have multiple unique identifiers for the different possible input object locations.

In Step 311, input objects that are greater than a size threshold are identified using the profiles to obtain a set of extraneous input objects (e.g., erroneous input object set) in accordance with one or more embodiments of the invention. In other words, input objects that are bigger than a size threshold are determined to be extraneous input objects. An extraneous input object is an input object placed on the input surface that is not intended by the user to be a command input. In particular, the user does not want the extraneous input object to be registered as a contact. For example, an extraneous input object may be a palm or hand hovering over the sensing region or touching the sensing region when a user is using a stylus or other passive pen in the same hand. By way of another example, the extraneous input object may be the user's second hand on the edge of the sensing region when the user is providing intentional input with the user's first hand.

Identifying input objects greater than the size threshold may be based on the input object on at least one of the axes being greater than the size threshold. By way of another example, input objects that are greater than the size threshold may be based on the aspect ratio of the input object being greater than the size threshold. The aspect ratio is the width of the input object on the first axis as compared to the width of the input object on another axis.

In one or more embodiments of the invention, the size threshold is a constant value. In other embodiments, the size threshold is a function. For example, the function may be a function of the width of the input object on the first axis and the width of the input object on another axis. Determining input objects that are greater than a size threshold may be in FIGS. 4 and 5.

In Step 313, the set of extraneous input objects are filtered from the set of identified objects to obtain a filtered set in accordance with one or more embodiments of the invention. In other words, the input objects in the capacitive image that match extraneous input objects in the sensing region are filtered from the set of input objects. The filtering may remove zero, one, or more than one depending on the particular execution. Further, the remaining input objects in the filtered set of input objects may be zero, one, or more than one depending on the particular execution. Because the filtering is based on the profiles, the filtering removes existing input objects that are at least partially present in the profiles and are detected to lesser degree in the capacitive image. For example, an input object that is at least partially hovering and only partially detected in the capacitive image may be removed filtered as an extraneous input object.

Although FIG. 3 shows identifying input objects in the sensing region using the capacitive image prior to performing filtering using profiles or other processing of FIG. 3, Step 307 may be performed concurrently with performing Steps 309-315, after Step 313 or at another time. For example, possible positions of non-extraneous or intentional input objects may be determined prior to identifying actual locations of input objects in accordance with one or more embodiments of the invention. In such a scenario, the filtering removes, using the profiles, positions of the input objects from the capacitive image that are to be analyzed for possible input objects in the capacitive image. The remaining positions may be analyzed for identifying any input objects.

In Step 315, positional information is obtained for the filtered set in accordance with one or more embodiments of the invention. In one or more embodiments of the invention, determining positional information may include identifying the position of the input object based on the peak values, determining the size and position of the input object based on the contiguous region, and determining other positional information about the input object. In some embodiments, positional information may be obtained earlier in the process so that input objects identified using the capacitive image and profiles can be compared.

In Step 317, the positional information is processed in accordance with one or more embodiments of the invention. For example, the input device may report the positional information to the host device. If the host device executes all or part of the processing system, the processing system may report the positional information to a host operating system, or the host operating system may report the positional information to an application. Processing the positional information may include performing an action based on the positional information. For example, the host device may change the state of the display of the user interface, change the state of the host device or perform another action.

FIG. 4 shows a flowchart for identifying input objects that are greater than a size threshold in accordance with one or more embodiments of the invention. In particular, FIG. 4 corresponds to a method for performing Step 311 in accordance with one or more embodiments of the invention. In Step 401, a profile of the sensing region is obtained in accordance with one or more embodiments of the invention. In particular, at least one of the profiles is selected.

In Step 403, the peaks in the profile are determined in accordance with one or more embodiments of the invention. For example, the peaks in the profiles may be determined based on the gradients of the measurements in the profiles. Where the gradient indicates a general increase in values on one side and a general decrease in values on another side, the peaks are determined as the midpoint between the general increase and the general decrease. Various techniques may be used to determine the peaks without departing from the scope of the invention.

In Step 405, contiguous regions in the profile are identified based on the peaks in accordance with one or more embodiments of the invention. For example, the contiguous regions may be identified using a flooding algorithm. The flooding algorithm identifies portions of the profile that are greater than the detection threshold and assigning the portions to a contiguous region by flooding outwards from the peaks. Other techniques may be used to identify contiguous regions in the profile without departing from the scope of the invention. Further, contiguous regions may be combined as discussed above with respect to FIG. 3.

In Step 407, contiguous region width is determined for each contiguous region in accordance with one or more embodiments of the invention. In one or more embodiments of the invention, the contiguous region width is a heuristic width that is based on applying heuristics to determine a point of intersection between the contiguous region and the detection threshold. Namely, the heuristic width is an approximation of the size of the contiguous region if measurement were acquired continuously rather than discretely. Different methods may be used to determine the contiguous region width as a heuristic. For example, the contiguous region width may be determined by applying interpolation using measurement values in the contiguous region and measurement values immediately adjacent to the contiguous region. The interpolation may be used to identify a line of best fit to the measurement values, and then determining a position of the line of best fit with the detection threshold. The intersection may be determined for both sides of the contiguous region in the capacitive image. Another technique for determining the contiguous region width may be performed using extrapolation. Determining the contiguous region width using extrapolation is described below with reference to FIG. 5.

Rather than or in addition to using heuristics, determining the contiguous region width may be an approximation that assumes the actual size of the input object matches the measurement values. In other words, measurement values that are in the contiguous region and adjacent to measurement values not in the contiguous region are determined to be the end of the contiguous region. In such embodiments, the width may be determined as the distance between measurement values that are greater than the detection threshold.

Figure 9:
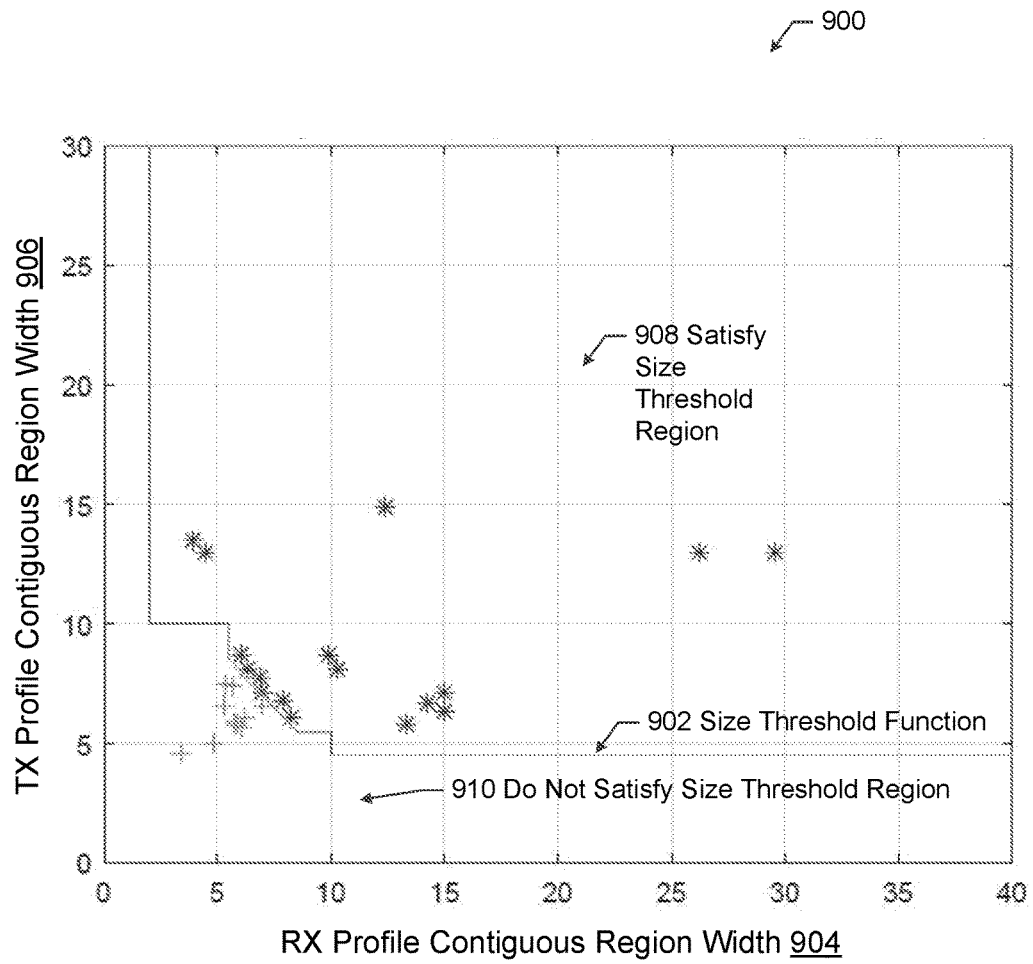

In Step 409, a contiguous region is selected in accordance with one or more embodiments of the invention. One or more embodiments may iterate through contiguous regions or process contiguous regions in parallel. In Step 411, a determination is made whether the contiguous region width satisfies the size threshold. As discussed above in FIG. 3, for a constant value size threshold, the contiguous region width satisfies the size threshold when the contiguous region width is greater than the size threshold. For a function based size threshold, the contiguous region width satisfies the size threshold when the output of the function indicates that the contiguous region is in a functional region indicating satisfaction with the size threshold function. In one or more embodiments, the function based size threshold is dependent on the contiguous region width along both axes. More particularly, the inputs to the function are the contiguous region width along both axes and the output is a binary value of pass or don't pass. Further, the function may be a piecewise function. For example, the piecewise function may be dependent on the value of at least one of the input(s). An example of a size threshold that is a function is shown in FIG. 9 and described below.

Continuing with FIG. 4, if the contiguous region width satisfies the size threshold, then the input object corresponding to the contiguous region is marked as extraneous (Step 413) in accordance with one or more embodiments of the invention. In other words, the unique identifier of the input object that is assigned during the matching process may be assigned as extraneous identifier. Thus, for the capacitive image, the input object is not processed as an intentional input for indicating a command.

In Step 415, a determination is made whether another contiguous region exists in accordance with one or more embodiments of the invention. If another unprocessed contiguous region exists, then the next contiguous region is processed in Step 409. Otherwise, the flow may proceed to end.

FIG. 5 shows a flowchart for determining contiguous region width in accordance with one or more embodiments of the invention. In particular, FIG. 5 shows an example for performing Step 407 of FIG. 4. Other techniques may be used to determine contiguous region width without departing from the scope of the invention.

In Step 501, a determination is made whether the contiguous region is at the edge of the sensing region. For example, the input object may be on the edge of the input device. Such a scenario may exist when a user is holding a mobile device. The hand holding the mobile device may overlap with the sensing region, but on the edge. The determination may be whether the contiguous region is within a threshold of the edge. For example, the determination may be based on the peak value of the contiguous region being on the edge or within a threshold of the edge.

If the contiguous region is at the edge of the sensing region, then a reflection is performed about the peak (Step 503) in accordance with one or more embodiments of the invention. In other words, the contiguous region is expanded such that the measurement values on the contiguous region that is within the sensing are assumed to be the same as the measurement values that would be on the sensing region if the sensing region were extended. The processing may proceed using the expanded contiguous region.

Regardless of whether the contiguous region is determined on the edge in Step 501, in Step 505, a first tuple having a location and a peak value of a peak in the contiguous region is obtained in accordance with one or more embodiments of the invention. In other words, the measurement value of the peak, with or without preprocessing, is related in the first tuple to the location of the peak along the contiguous region.

In Step 507, for a first side of the contiguous region, the edge measurement location in the contiguous region adjacent to an intersection with a width base level and having a measured value greater than width base level value is determined. In one or more embodiments of the invention, the width base level may be the detection threshold described above. Various techniques may be used to determine the width base level. Performing Step 507 may proceed by, for each measurement value in the profile that is in or adjacent to the contiguous region, making a determination whether the measurement value is greater than or less than the width base level value. The measurement value that is greater than the width base level value and adjacent to a measurement value that is less than the width base level value is identified as the edge measurement.

In Step 509, for a first side of the contiguous region, a second tuple having an edge measurement location and a last measurement value is obtained in accordance with one or more embodiments of the invention. The second tuple relates the measurement value to the measurement location for the edge measurement.

In Step 511, for the first side of the contiguous region, a line intersecting the first tuple and the second tuple is identified. In one or more embodiments, the linear function that includes the first tuple and the second tuple is calculated. The linear function may be calculated using algebraic techniques. The contiguous region edge location for the first side of the contiguous region is determined in Step 513. The contiguous region edge location is the location at which the line intersects the width base level. Determining the contiguous region edge location may be performed by using the width base level value as input into the linear function. Thus, the contiguous region edge location may be a real number having a decimal value.

Continuing with FIG. 5, Steps 515-521 repeat Steps 507-513 but for the second side of the contiguous region in accordance with one or more embodiments of the invention. In Step 515, for a second side of the contiguous region, the edge measurement location in contiguous region adjacent to an intersection with a width base level and having a measured value greater than width base level value is determined. In Step 517, for a second side of the contiguous region, a second tuple having an edge measurement location and a last measurement value is obtained in accordance with one or more embodiments of the invention. In Step 519, for the second side of the contiguous region, a line intersecting the first tuple and the second tuple is determined. The contiguous region edge location for the second side of the contiguous region is identified in Step 521. Steps 515-521 may be performed in a same or similar manner to Steps 507-513, respectively.

In Step 523, the distance between the contiguous region edge location for the first side of the contiguous region and the contiguous region edge location for the second side of the contiguous region is determined as the contiguous region width in accordance with one or more embodiments of the invention. In other words, a mathematical difference in value is obtained by taking the absolute value of the contiguous region edge location for the first side of the contiguous region minus the contiguous region edge location for the second side of the contiguous region. The resulting value may be deemed to be a more accurate approximation of the contiguous region width than if only the locations of the measurement values were considered.

Continuing with the discussion, FIGS. 6.1, 6.2, 6.3, 7, 8, and 9 show examples in accordance with one or more embodiments of the invention. The examples shown in FIGS. 6-9 are for explanatory purposes only and not intended to limit the scope of the invention.

FIGS. 6.1, 6.2, and 6.3 show an example set of diagrams showing a scenario in which one or more embodiments of the invention may be used. Each subsequent diagram shows a scenario that is temporally after the immediate preceding diagram. In other words, FIGS. 6.1, 6.2, and 6.3 show an example in which a user's hand approaches the sensing region. In the example set of diagrams, a user's hand (600) is holding a stylus (602) and approaches the sensing region to write on the sensing surface. Initially, in FIG. 6.1, the user hand (600) is hovering above the sensing region (604). As shown by the capacitive image (606), the users hand is detected in the capacitive image as being a small input object (608) that is indistinguishable in the capacitive image from a finger. Thus, analyzing the capacitive image in isolation, a finger may be detected and reported as a command to the host device. If a drawing software application is being used, the host device may interpret the command as a request to draw on the virtual page being displayed. Accordingly, the host device incorrectly provides a response to the extraneous input object. However, using the techniques described above with the profiles, the profiles show that the actual size of the input object is much larger and satisfies the size threshold. Thus, the input object is filtered from the set of input objects and no command reported to the host device. Notably, the filtering may remove the input object or only mark the input object as extraneous when reported to the host device.

Continuing with the example, in FIG. 6.2, the user hand (600) is hovering above the sensing region (604) and closer to the sensing region (604) than in FIG. 6.1. As shown by the capacitive image (610), the users hand is detected in the capacitive image as being a larger input object that may or may not be indistinguishable in the capacitive image from a finger. Thus, the hand may or may not be reported as a command when transmitted to the host device. However, using the techniques described above with the profiles, the profiles show that the actual size of the input object is much larger and satisfies the size threshold. Thus, the input object is filtered from the set of input objects and no command reported to the host device.

In FIG. 6.3, the user's hand (600) and the stylus (602) has touched on the sensing region (604) in accordance with one or more embodiments of the invention. As shown by the capacitive image (614), the user's hand (600) appears as a large input object (616) and the stylus (602) as a small input object (618). Thus, the large input object (616) may be filtered from the capacitive image (614) while maintaining the small input object (618) corresponding to the stylus. The filtering is consistent between the profiles and the capacitive image.

As shown in the above example, one or more embodiments may be used to filter extraneous input objects that hover over the sensing region and yet are still detectable in the capacitive image. Such a situation may occur, when a hand is transitioning from being on the sensing region or away from the sensing region or when the hand is near the sensing region. One or more embodiments may be applied to other occurrences without departing from the scope of the invention.

Figure 7:
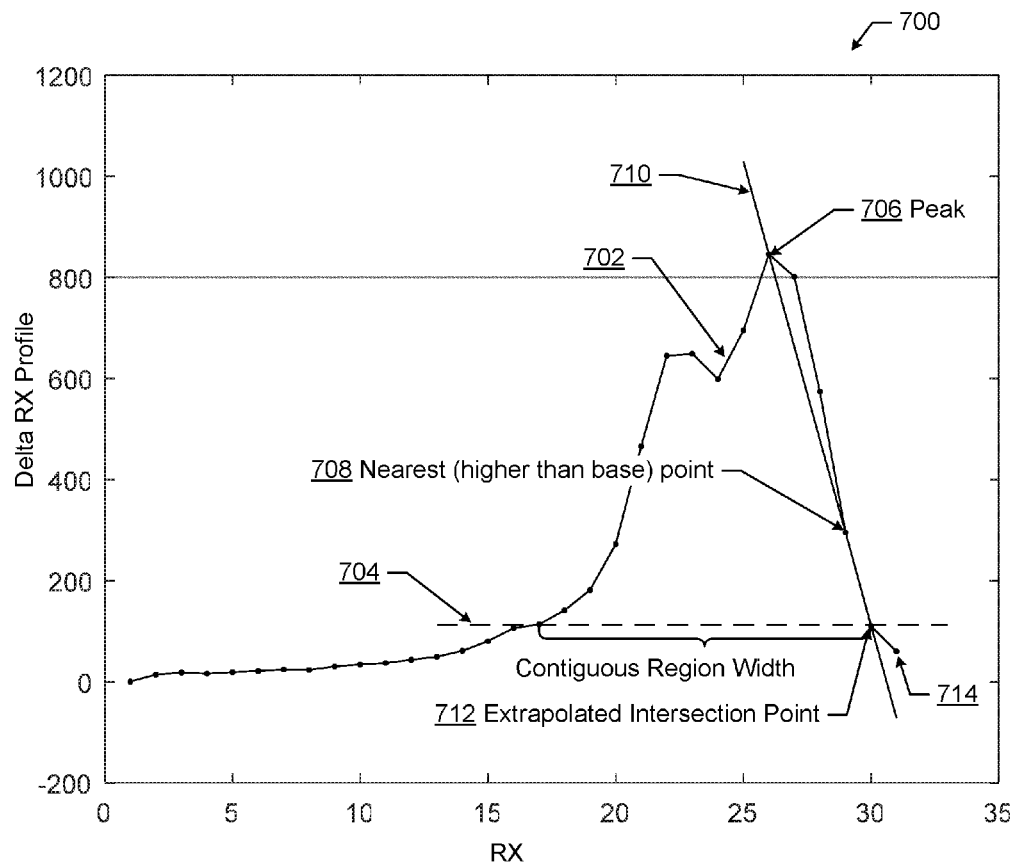

FIG. 7 is a graph (700) of an example profile (702) in accordance with one or more embodiments of the invention. In the graph (700), the dotted line (704) is at the width base level. As shown in the graph (700), the peak (706) is determined. Further, the nearest point (708) that is greater than the width base level (704) and adjacent to point (714) that is less than the width base level is determined. From the peak (706) and the nearest point (708), line (710) is calculated. The line may be used to obtain an extrapolated intersection point (712), which is then used to determine the contiguous region width (714).

Figure 8:
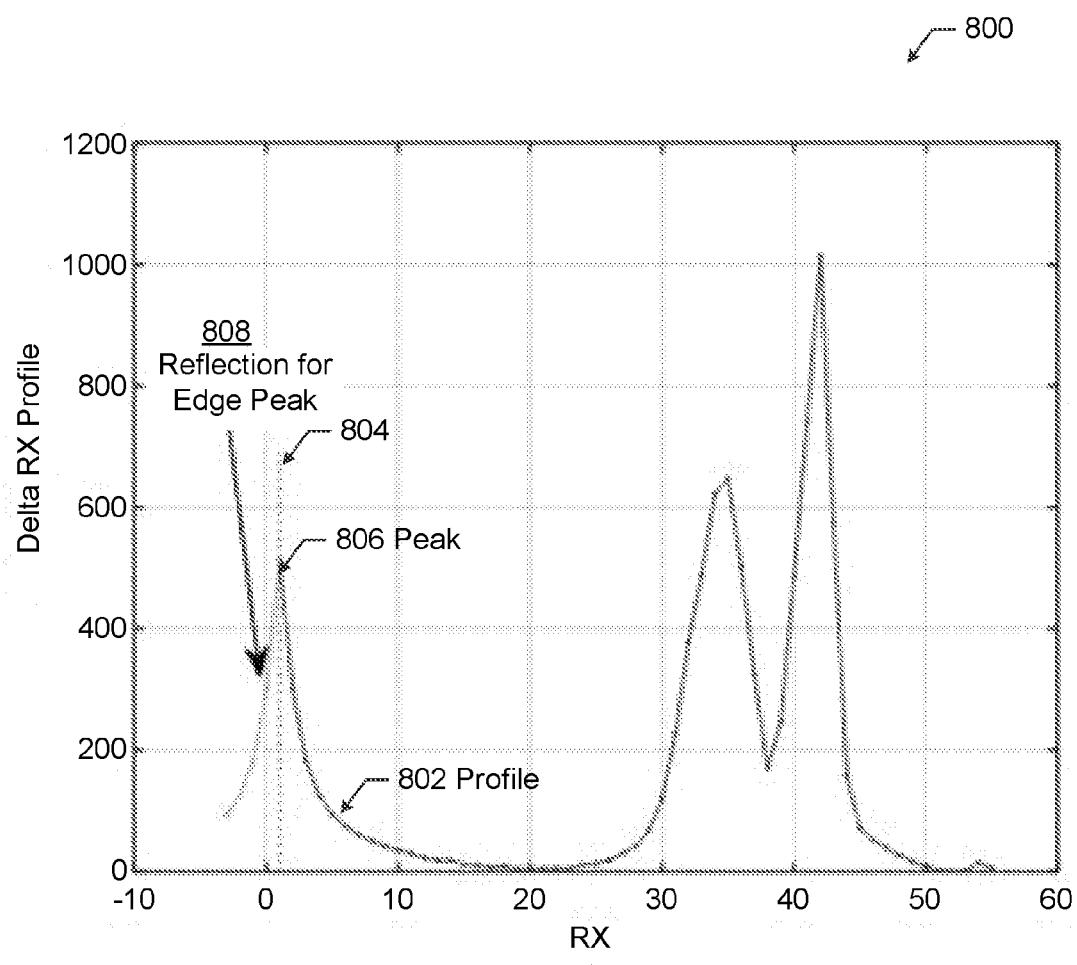

FIG. 8 is a graph (800) of an example profile (802) in accordance with one or more embodiments of the invention. In the graph (800), the dotted line (804) is a line of reflection of the measurement values. In particular, because the peak (806) is within a threshold distance to the edge of the sensing region (as denoted by the 0 on the RX axis), the measurement values on the right side of the peak are reflected onto the left side of the peak. The reflection (808) extends the contiguous region in order to better estimate the contiguous region width. Thus, the contiguous region width is determined as the distance between two points on the profile, where one point is not actually measured. Notably, performing the reflection may be just multiplying the distance between the peak location and the edge measurement location by two to calculate the contiguous region size.

FIG. 9 shows a graph (900) of an example continuous piecewise size threshold function (902). The size threshold function (902) uses, as input, the contiguous region width along each axis (e.g., the RX axis and the TX axis). In other words, the RX profile contiguous region width (904) and the TX profile contiguous region width (906) are mapped by the function to a first region (908) that satisfies the size threshold for being an extraneous input object and a second region (910) that does not satisfy the size threshold and is a valid input object. In other words, input objects having contiguous region widths for the profiles in the first region (908) are filtered from the input object set, while input objects having contiguous region widths for the profiles in the second region (910) are processed as normal in accordance with one or more embodiments of the invention.

As discussed above, the graphs shown in FIG. 7-9 are only for example purposes and are not intended to limit the scope of the invention. Other functions may be used without departing from the scope of the invention.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Accordingly, the scope of the invention should be limited only by the attached claims.

What is claimed is:

1. A processing system for hybrid rejection comprising:
    a sensor module coupled to a plurality of sensor electrodes, and configured to:
        acquire, using a first sensing technique, first sensing data, wherein the first sensing technique comprises:
            driving a first subset of the plurality of sensor electrodes with a plurality of transmitter signals, and
            receiving, based on the plurality of transmitter signals, a first plurality of resulting signals from a second subset of the plurality of sensor electrodes, and
        acquire second sensing data using a second sensing technique and a third subset of the plurality of sensor electrodes, wherein the second sensing technique is different from the first sensing technique; and
    a determination module configured to:
        obtain a capacitive image of a sensing region based on the first sensing data,
        determine a first input object set in the sensing region using the capacitive image,
        obtain a first capacitive profile of the sensing region based on the second sensing data, wherein the first capacitive profile corresponds to changes in capacitive coupling between the first input object set and the third subset of the plurality of sensor electrodes,
        determine a first contiguous region width of a first contiguous region in the first capacitive profile, the first contiguous region corresponding to a first input object in the first input object set,
        filter the first input object from the first input object set based on the first contiguous region width satisfying a size threshold to obtain a first filtered input object set, and
        process the first filtered input object set.

2. The processing system of claim 1, wherein the determination module is further configured to:
    determine a second contiguous region width of a second contiguous region in a second capacitive profile, wherein the second capacitive profile is along a different axis than the first capacitive profile, and wherein the second contiguous region and the first contiguous region are for the first input object,
    wherein filtering the first input object is further based on the second contiguous region width and the size threshold, wherein the size threshold is a function of the first contiguous region width and the second contiguous region width.

3. The processing system of claim 1, wherein acquiring the first sensing data comprises receiving the first resulting signals from the second subset of the plurality of sensor electrodes while modulating the second subset of the plurality of sensor electrodes.

4. The processing system of claim 1, wherein the sensor module is further configured to receive a second plurality of resulting signals from the first subset while the first subset are driven with modulated signals, and wherein the determination module is further configured to:
obtain a second capacitive profile of a sensing region based on the second plurality of resulting signals;
determine a second contiguous region width of a second contiguous region in the second capacitive profile, and wherein the second contiguous region and the first contiguous region are for the first input object, and
determine that the second contiguous region width is less than the size threshold.

5. The processing system of claim 1, wherein the determination module is further configured to:
determine a second input object set in the sensing region,
obtain a second capacitive profile and third capacitive profile of the sensing region,
determine an aggregated size of a second contiguous region in the second capacitive profile and the third capacitive profile, the second contiguous region corresponding to a second input object in the second input object set,
filter the second input object from the second input object set based on the aggregated size being greater than an aggregated threshold to obtain a second filtered input object set, and
process the second filtered input object set.

6. The processing system of claim 1, wherein the first input object set comprises a second input object, the second input object being a stylus.

7. The processing system of claim 1, wherein determining the contiguous region width comprises:
obtain a first tuple comprising a location and a peak value of a peak in the contiguous region,
determine, for a first side of the contiguous region, a first edge measurement location in the contiguous region, the first edge measurement location having a first measured value adjacent to a first intersection with a width base level, the first measured value greater than a width base level value of the width base level,
obtain a second tuple comprising the first edge measurement location and the first measured value,
determining a first line connecting the first tuple to the second tuple,
determining the first intersection with the width base level using the width base level value and the first line, and
determining the contiguous region width as a distance between the first intersection and a second intersection with the width base level.

8. The processing system of claim 7, wherein determining the contiguous region width comprises:
determine, for a second side of the contiguous region, a second edge measurement location in the contiguous region, the second edge measurement location having a second measured value adjacent to the second intersection with the width base level, the second measured value greater than the width base level value,
obtain a third tuple comprising the second edge measurement location and the second measured value,
determining a second line connecting the first tuple to the third tuple,
determining the second intersection with the width base level using the width base level value and the second line.

9. The processing system of claim 1, performing interpolation using at least two measured values in the first capacitive profile to identify a first intersection with a width base level, and determining the contiguous region width as a distance between the first intersection and a second intersection with the width base level.

10. The processing system of claim 1, wherein the determination module is further configured to, prior to filtering the first input object from the first input object set, classifying each input object in the first input object set using the capacitive image.

11. The processing system of claim 1, wherein the determination module is further configured to, concurrently with filtering the first input object from the first input object set, classifying each input object in the first input object set using the capacitive image.

12. The processing system of claim 1, wherein the determination module is further configured to:
combine, to create the first contiguous region, a second contiguous region with a third contiguous region.

13. The processing system of claim 1, wherein the determination module is further configured to:
determine that the first contiguous region corresponds to a distinct input object from an input object of a second contiguous region based on the first contiguous region comprising a peak value that is more than a threshold difference than a peak value of the second contiguous region.

14. A method for hybrid rejection comprising:
acquiring, using a first sensing technique, first sensing data, wherein the first sensing technique comprises:
driving a first subset of the plurality of sensor electrodes with a plurality of transmitter signals, and
receiving, based on the plurality of transmitter signals, a first plurality of resulting signals from a second subset of the plurality of sensor electrodes;
acquiring, using a second capacitive sensing technique, second sensing data using a third subset of the plurality of sensor electrodes, wherein the second sensing technique is different from the first sensing technique;
obtaining a capacitive image of a sensing region based on the first sensing data;
determining a first input object set in the sensing region using the capacitive image;
obtaining a first capacitive profile of the sensing region based on the second sensing data, wherein the first capacitive profile corresponds to changes in capacitive coupling between the first input object set and the third subset of the plurality of sensor electrodes;
determining a first contiguous region width of a first contiguous region in the first capacitive profile, the first contiguous region corresponding to a first input object in the first input object set;
filtering the first input object from the first input object set based on the first contiguous region width satisfying a size threshold to obtain a first filtered input object set; and
processing the first filtered input object set.

15. The method of claim 14, further comprising:
receiving a second plurality of resulting signals from the first subset;
obtaining a second capacitive profile of a sensing region based on the second plurality of resulting signals;
determining a second contiguous region width of a second contiguous region in the second capacitive profile, and wherein the second contiguous region and the first contiguous region are for the first input object, and
determining that the second contiguous region width is less than the size threshold.

16. The method of claim 14, further comprising:
determining a second input object set in the sensing region,
obtaining a second capacitive profile and third capacitive profile of the sensing region,
determining an aggregated size of a second contiguous region in the second capacitive profile and the third capacitive profile, the second contiguous region corresponding to a second input object in the second input object set,
filtering the second input object from the second input object set based on the aggregated size being greater than an aggregated threshold to obtain a second filtered input object set, and
processing the second filtered input object set.

17. The method of claim 14, further comprising: prior to filtering the first input object from the first input object set, classifying each input object in the first input object set using the capacitive image.

18. An input device for hybrid rejection comprising:
a plurality of sensor electrodes configured to:
acquire first sensing data using a first sensing technique, wherein the first sensing technique comprises:
driving a first subset of the plurality of sensor electrodes with a plurality of transmitter signals, and
receiving, based on the plurality of transmitter signals, a first plurality of resulting signals from a second subset of the plurality of sensor electrodes, and
acquire second sensing data using a second sensing technique and a third subset of the plurality of sensor electrodes, wherein the second sensing technique is different from the first sensing technique;
a processing system configured to:
obtain a capacitive image of a sensing region based on the first sensing data,
determine an input object set in the sensing region using the capacitive image,
obtain a capacitive profile of the sensing region based on the second sensing data, wherein the capacitive profile corresponds to changes in capacitive coupling between the input object set and the third subset of the plurality of sensor electrodes,
determine a contiguous region width of a contiguous region in the capacitive profile, the contiguous region corresponding to an input object in the input object set,
filter the input object from the input object set based on the contiguous region width satisfying a size threshold to obtain a filtered input object set, and
process the filtered input object set.

* * * * *